US011933988B2

(12) United States Patent
Hasegawa et al.

(10) Patent No.: US 11,933,988 B2
(45) Date of Patent: Mar. 19, 2024

(54) INFORMATION PROCESSING APPARATUS, INFORMATION PROCESSING METHOD, HEAD MOUNTED DISPLAY HOUSING, AND HEAD MOUNTED DISPLAY SYSTEM

(71) Applicant: SONY GROUP CORPORATION, Tokyo (JP)

(72) Inventors: Yuichi Hasegawa, Tokyo (JP); Ichiro Tsujimura, Tokyo (JP); Masumi Sawaya, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 17/997,608

(22) PCT Filed: Apr. 23, 2021

(86) PCT No.: PCT/JP2021/016461
§ 371 (c)(1),
(2) Date: Oct. 31, 2022

(87) PCT Pub. No.: WO2021/225082
PCT Pub. Date: Nov. 11, 2021

(65) Prior Publication Data
US 2023/0161164 A1    May 25, 2023

(30) Foreign Application Priority Data
May 7, 2020  (JP) .................. 2020-082282

(51) Int. Cl.
*G02B 27/01*  (2006.01)
(52) U.S. Cl.
CPC ..... *G02B 27/0172* (2013.01); *G02B 27/0179* (2013.01); *G02B 2027/0136* (2013.01); *G02B 2027/0138* (2013.01); *G02B 2027/014* (2013.01)

(58) Field of Classification Search
CPC ............ G02B 27/0172; G02B 27/0179; H04N 13/344
See application file for complete search history.

(56) References Cited

U.S. PATENT DOCUMENTS

2019/0273911 A1     9/2019  Perreault et al.
2020/0275087 A1*   8/2020  Yasuda ................ H04N 13/371

FOREIGN PATENT DOCUMENTS

JP     62-239784 A    10/1987
JP    2011-155631 A    8/2011
(Continued)

OTHER PUBLICATIONS

International Search Report and Written Opinion of PCT Application No. PCT/JP2021/016461, dated Jul. 20, 2021, 12 pages of ISRWO.

*Primary Examiner* — Sardis F Azongha
(74) *Attorney, Agent, or Firm* — CHIP LAW GROUP

(57) ABSTRACT

Provided are an information processing apparatus, a head mounted display housing, and an information processing method capable of providing a virtual reality experience suitable for individual users. Provided is an information processing apparatus that is detachably held by a housing to be usable as a head mounted display, and that includes a display unit (306) that displays an image; a detection unit (308) that detects an indicator provided in the housing; and a control unit (302) that controls the image displayed on the display unit based on information indicated by the indicator, the information being detected by the detection unit.

20 Claims, 13 Drawing Sheets

(56) References Cited

FOREIGN PATENT DOCUMENTS

| | | |
|---|---|---|
| JP | 2017-528935 A | 9/2017 |
| JP | 2020-057864 A | 4/2020 |
| WO | 2014/057557 A1 | 4/2014 |
| WO | 2015/079610 A1 | 6/2015 |
| WO | 2018/150722 A1 | 8/2018 |

\* cited by examiner

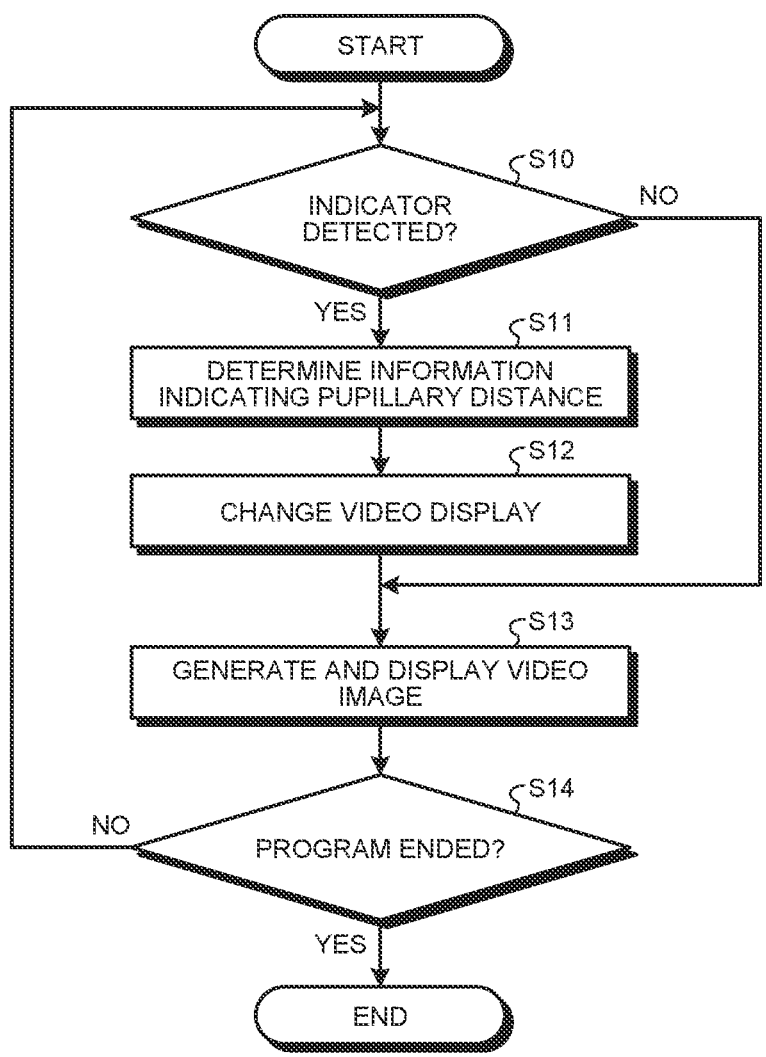

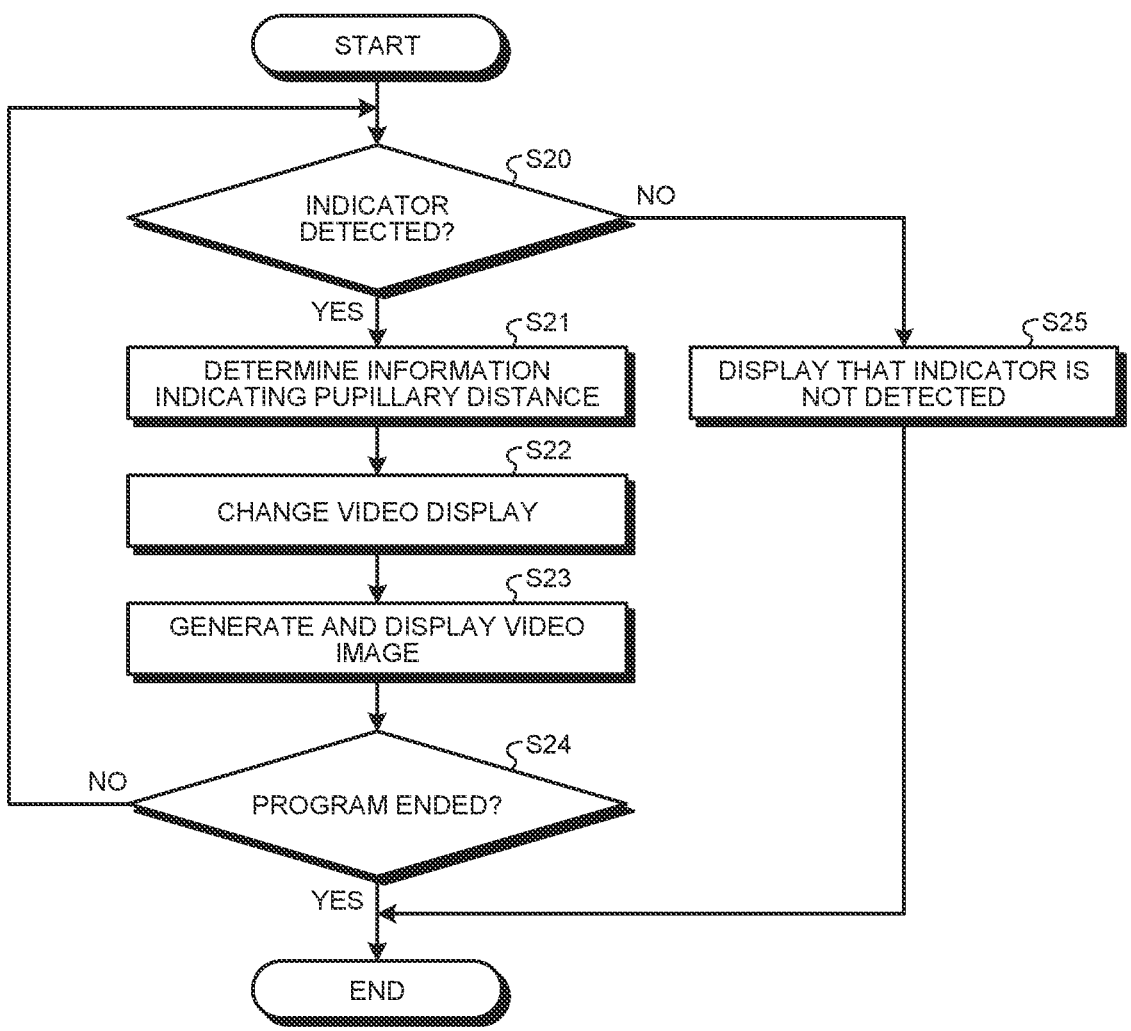

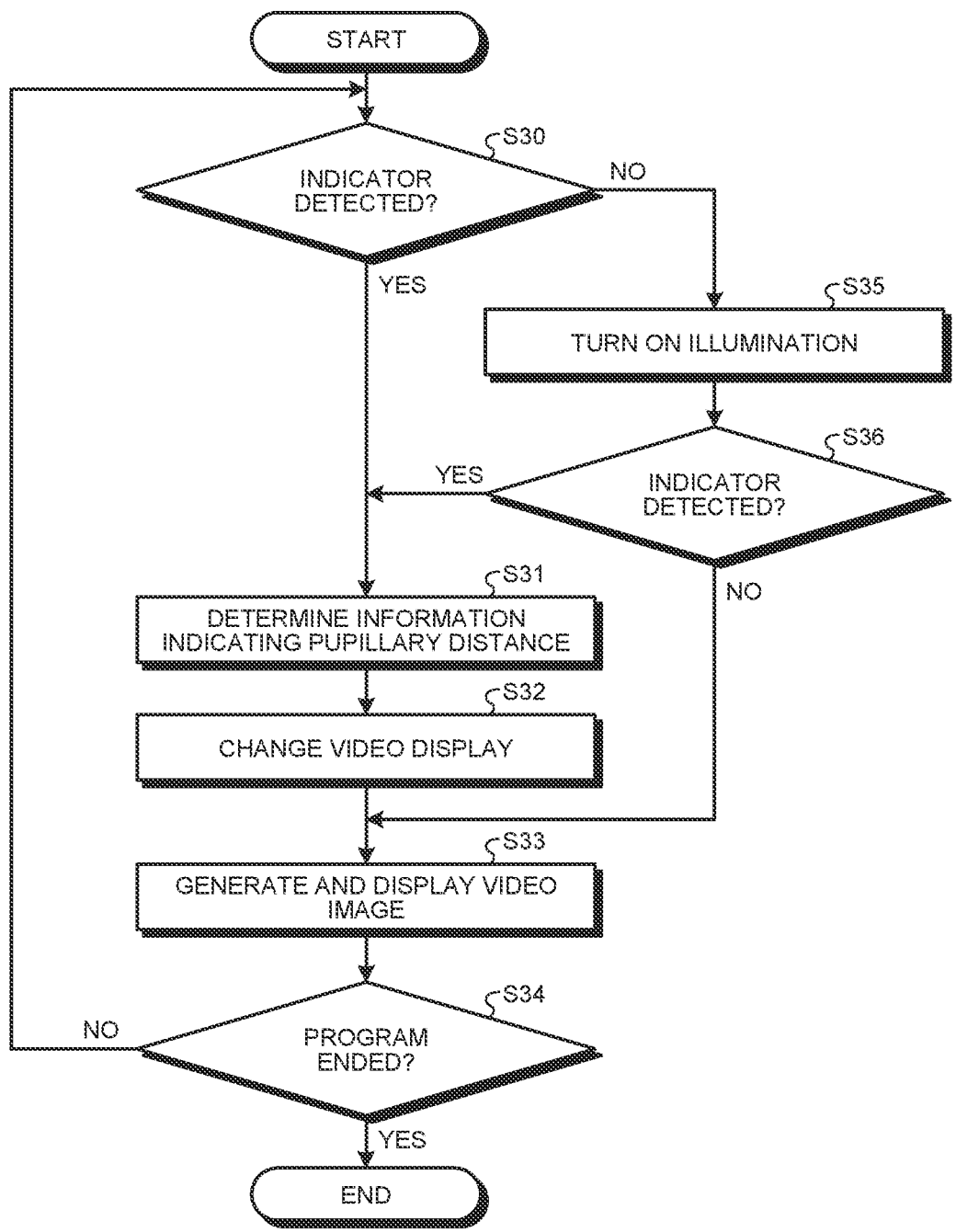

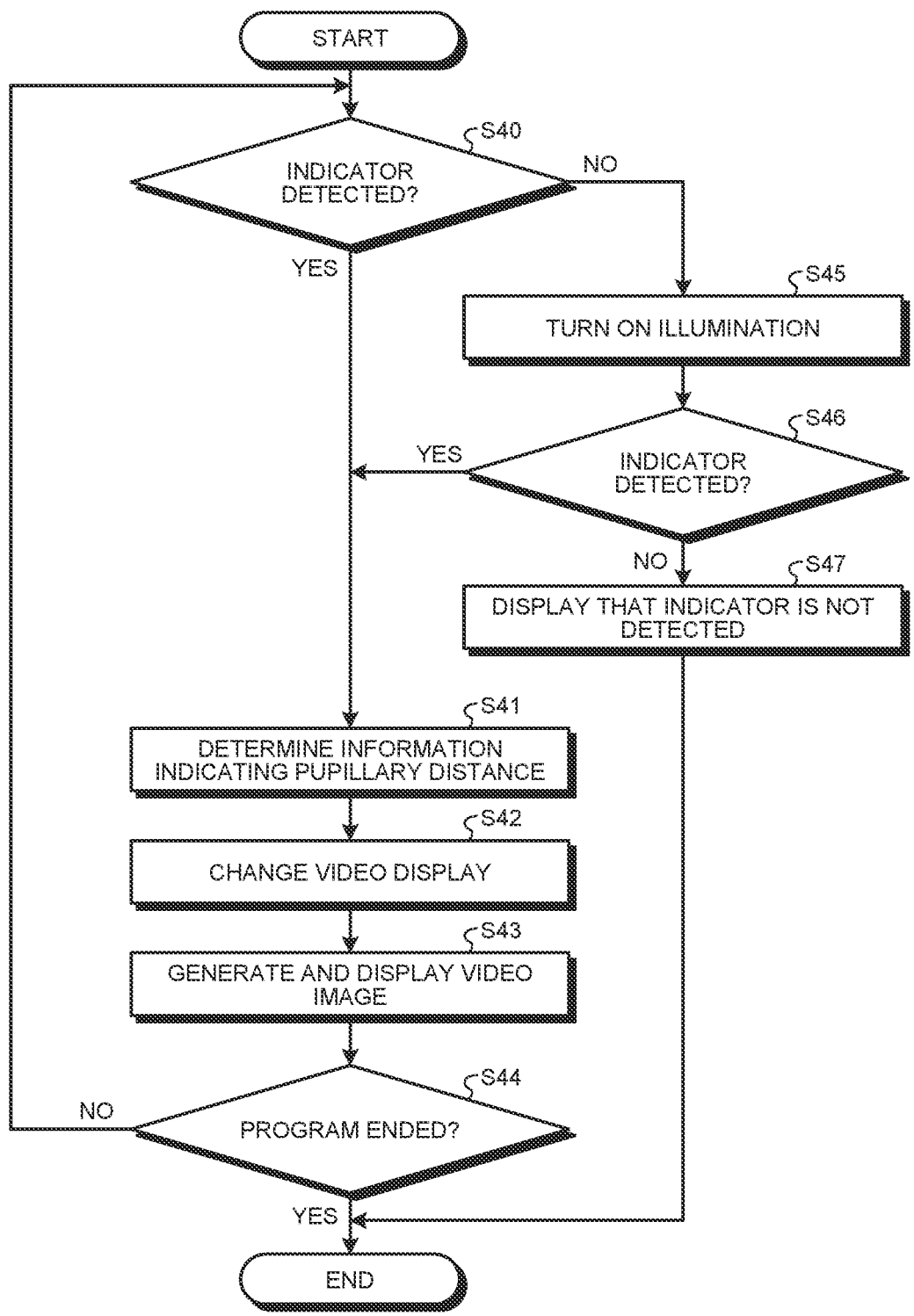

INFORMATION PROCESSING APPARATUS, INFORMATION PROCESSING METHOD, HEAD MOUNTED DISPLAY HOUSING, AND HEAD MOUNTED DISPLAY SYSTEM

CROSS REFERENCE TO RELATED APPLICATIONS

This application is a U.S. National Phase of International Patent Application No. PCT/JP2021/016461 filed on Apr. 23, 2021, which claims priority benefit of Japanese Patent Application No. JP 2020-082282 filed in the Japan Patent Office on May 7, 2020. Each of the above-referenced applications is hereby incorporated herein by reference in its entirety.

FIELD

The present disclosure relates to an information processing apparatus, an information processing method, a head mounted display housing, and a head mounted display system.

BACKGROUND

A technique related to a head mounted display capable of holding eyeglasses for vision correction with a simple configuration has been developed. An example of such a technique includes a technique described in Patent Literature 1 below.

CITATION LIST

Patent Literature

Patent Literature 1: WO 2015/079610 A

SUMMARY

Technical Problem

However, in the related art, a design idea such as controlling a display image according to a pupillary distance of a user or the like is not created, and a virtual reality experience suitable for each user cannot be provided.

The present disclosure has been made in view of the above, and an object thereof is to provide an information processing apparatus, a head mounted display housing, and an information processing method capable of providing a virtual reality experience suitable for each user.

Solution to Problem

To solve the above-described problem and achieve the object, in the present disclosure, an information processing apparatus that is detachably held by a housing to be usable as a head mounted display, the information processing apparatus comprising: a display unit that displays an image; a detection unit that detects an indicator provided in the housing; and a control unit that controls the image displayed on the display unit based on information indicated by the indicator detected by the detection unit is provided.

BRIEF DESCRIPTION OF DRAWINGS

FIG. 6 is a flowchart illustrating an example of a processing procedure executed by the information processing apparatus according to an embodiment.

FIG. 7 is a flowchart illustrating an example of a processing procedure executed by the information processing apparatus according to an embodiment.

FIG. 8 is a flowchart illustrating an example of a processing procedure executed by the information processing apparatus according to an embodiment.

FIG. 9 is a flowchart illustrating an example of a processing procedure executed by the information processing apparatus according to an embodiment.

DESCRIPTION OF EMBODIMENTS

Figure 1A:
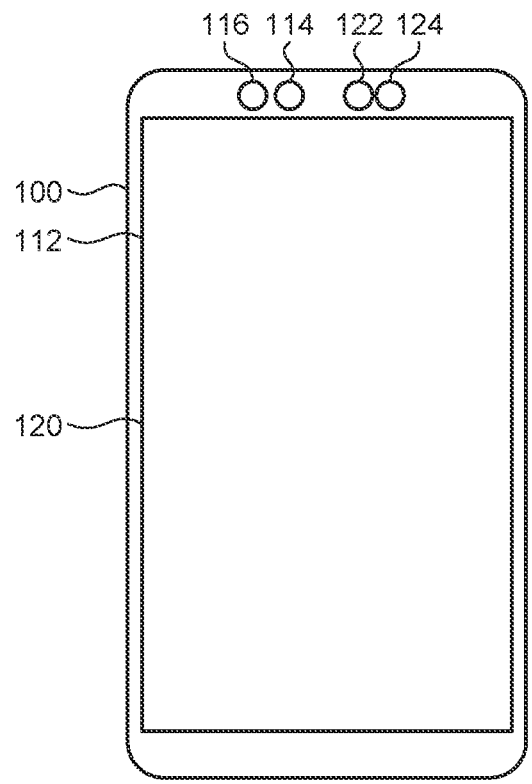
FIG. 1A is a diagram for explaining an example of an information processing apparatus according to an embodiment.
Figure 1B:
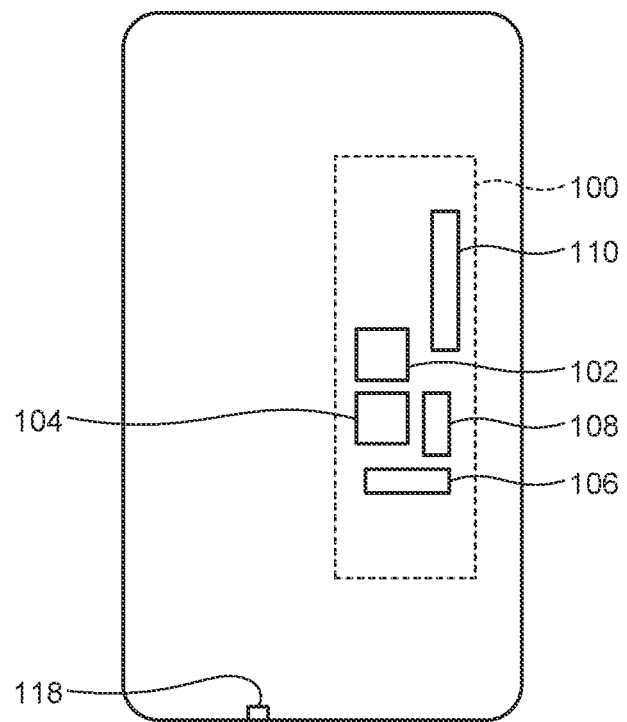
FIG. 1B is a diagram for explaining an example of the information processing apparatus according to an embodiment.
Figure 1C:
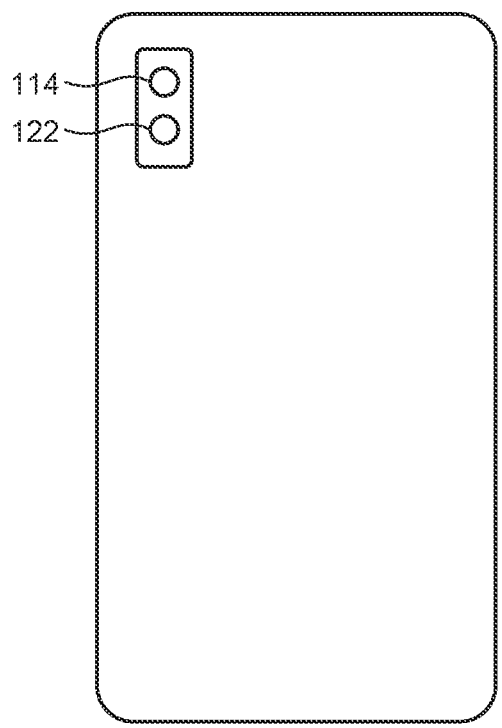
FIG. 1C is a diagram for explaining an example of the information processing apparatus according to an embodiment.
Figure 1D:
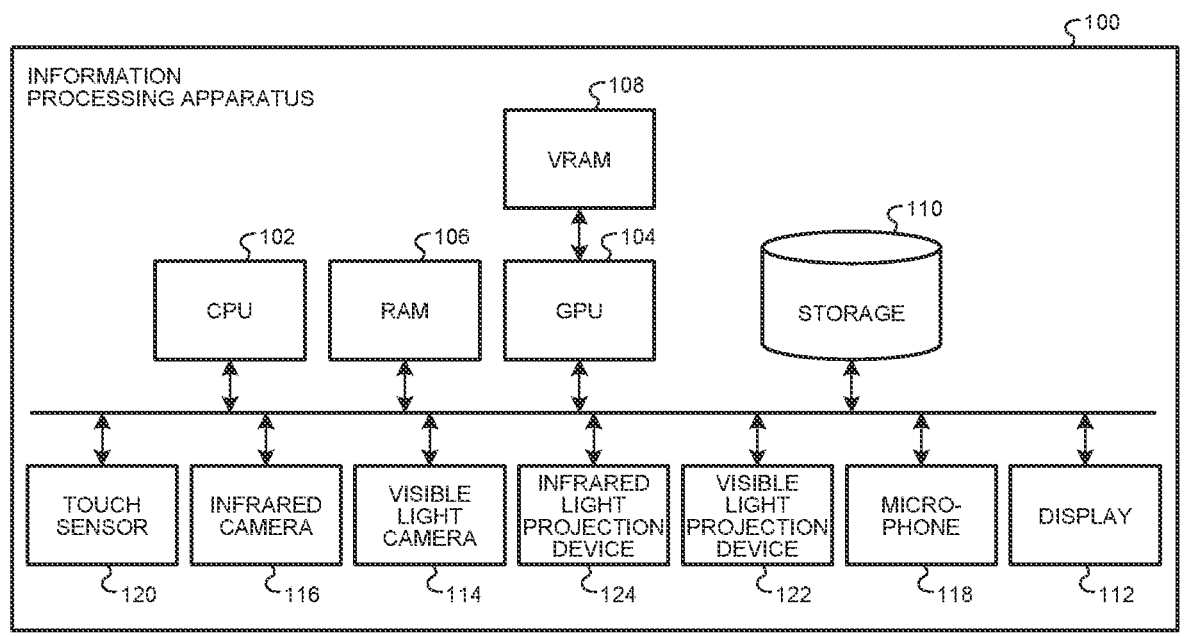
FIG. 1D is a diagram for explaining an example of the information processing apparatus according to an embodiment.

Hereinafter, preferred embodiments of the present disclosure will be described in detail with reference to the accompanying drawings. Note that, in the present specification and drawings, redundant description of a component having substantially the same functional configuration is omitted by providing the same reference sign.

Further, the present disclosure will be described in the order of the following items.

1. An embodiment
  1.1. Hardware configuration
    1.1-1. Information processing apparatus
    1.1-2. Head mounted display housing
  1.2. Functional configuration of information processing apparatus
  1.3. Summary of method of use
  1.4. Description of operation (flowchart)

2. Other embodiments

[1. An Embodiment]

First, as an embodiment, an example in which an information processing apparatus and a head mounted display housing are combined and used as a head mounted display will be described.

[1.1. Hardware Configuration]

First, a configuration of hardware in the present disclosure will be described. Hereinafter, a configuration example of hardware of each of the information processing apparatus and the head mounted display housing according to the present embodiment will be described.

[1.1-1. Information Processing Apparatus]

FIGS. 1A, 1B, 1C, and 1D are diagrams illustrating examples of an external front face, an internal view, an external back face, and a hardware configuration diagram of the information processing apparatus according to the present embodiment, respectively. An information processing apparatus 100 in the present embodiment includes a central processing unit (CPU) 102, a graphics processing unit (GPU) 104, a random access memory (RAM) 106, a video RAM (VRAM) 108, a storage 110, a display 112, a visible light camera 114, an infrared camera 116, a microphone 118, a touch sensor 120, a visible light projection device 122, an infrared light projection device 124, and the like, and they are mainly connected via a bus 126.

In the present embodiment, the CPU 102 is an arithmetic device that performs various calculations. For example, the CPU 102 copies a program 3042 stored in the storage 110 to the RAM 106 and executes the program. The CPU 102 may be part of an integrated circuit constituting a system on a chip (SoC) provided on a control board.

The CPU 102 also controls an image displayed on the display 112. For example, it issues a command for displaying an image recorded in the VRAM 108 on the display 112 to the GPU 104 to display the image on the display 112.

The CPU 102 also controls various devices such as the GPU 104, the RAM 106, the VRAM 108, the storage 110, the display 112, the visible light camera 114, the infrared camera 116, the microphone 118, the touch sensor 120, the visible light projection device 122, and the infrared light projection device 124, and processes inputs from the various devices.

In the present embodiment, the GPU 104 is an arithmetic device mainly intended to execute calculation for image processing, and executes calculation in response to a command from the CPU 102 as described above. As in the CPU 102, the GPU 104 may also be part of an integrated circuit constituting a system on a chip (SoC) provided on the control board.

In the present embodiment, the RAM 106 is a main storage device used as a work area when the CPU 102 executes the program 3042. As in the CPU 102 and the GPU 104, the RAM 106 may also be part of an integrated circuit constituting the SoC provided on the control board.

In the present embodiment, the VRAM 108 is a main storage device mainly used as a work area when the above-described GPU 104 executes calculation for image processing. The VRAM 108 may be a unified memory architecture (UMA) that is a configuration shared with the RAM 106 described above.

In the present embodiment, the storage 110 includes, for example, an auxiliary storage device such as a hard disc drive (HDD) or a flash memory.

The display 112 according to the present embodiment visibly presents an image generated by the GPU 104 or the like to the user, and is realized by, for example, a liquid crystal display, an organic electro-luminescence (EL) display, or the like.

The visible light camera 114 in the present embodiment includes at least a lens 206, an image sensor (CMOS, CCD, etc.), and a color filter. The visible light camera 114 may be disposed on either the front face or the back face of the information processing apparatus 100, or may be disposed on both the front face and the back face. Further, the visible light cameras 114 having a plurality of focal lengths may be additionally provided.

The infrared camera 116 in the present embodiment includes at least a lens 206, an image sensor (CMOS, CCD, etc.), and an infrared filter. As in the visible light camera 114, the infrared camera 116 may be disposed on either the front face or the back face of the information processing apparatus 100, or may be disposed on both the front face and the back face. Furthermore, the infrared camera 116 having a plurality of focal lengths may be additionally provided, or may be provided side by side with the visible light camera 114.

The microphone 118 in the present embodiment is a device that converts sound into an electrical signal. For example, in a case where the information processing apparatus 100 is used as a mobile phone, in order to enable the users to have a conversation with each other, the microphone 118 converts an utterance of the user into an electrical signal, and the converted electrical signal is transmitted to a conversation counterpart.

The touch sensor 120 in the present embodiment has a function of detecting contact by the user. The touch sensor 120 may be, for example, a capacitive or pressure-sensitive touch sensor 120. The touch sensor 120 can detect a contact action such as touching, stroking, hitting, or pushing by the user, and can perform an operation corresponding to the contact action. The touch sensor 120 may be provided integrally with the display 112 of the information processing apparatus 100.

Examples of the visible light projection device 122 in the present embodiment include a photographic flash such as a xenon tube flash or an LED flash. When an object is imaged by the visible light camera 114, even in a case where the amount of light is insufficient due to a dark place, the visible light projection device 122 can be caused to emit light to obtain the amount of visible light, thereby enabling imaging.

Examples of the infrared light projection device 124 in the present embodiment include an infrared light for capturing an image with an infrared camera, an infrared dot projector, and the like. As in the visible light projection device 122, the infrared light projection device 124 can also cause the infrared light projection device 124 to emit light to obtain the amount of infrared light even in a case where the amount of light is insufficient due to a dark place when the infrared camera 116 images an object, thereby enabling imaging.

The information processing apparatus 100 exemplified in the present description is merely an example, and various information processing apparatuses including a display and a camera, such as a smartphone, a tablet terminal, and a portable game machine, can be used.

[1.1-2. Head Mounted Display Housing]

Figure 2A:
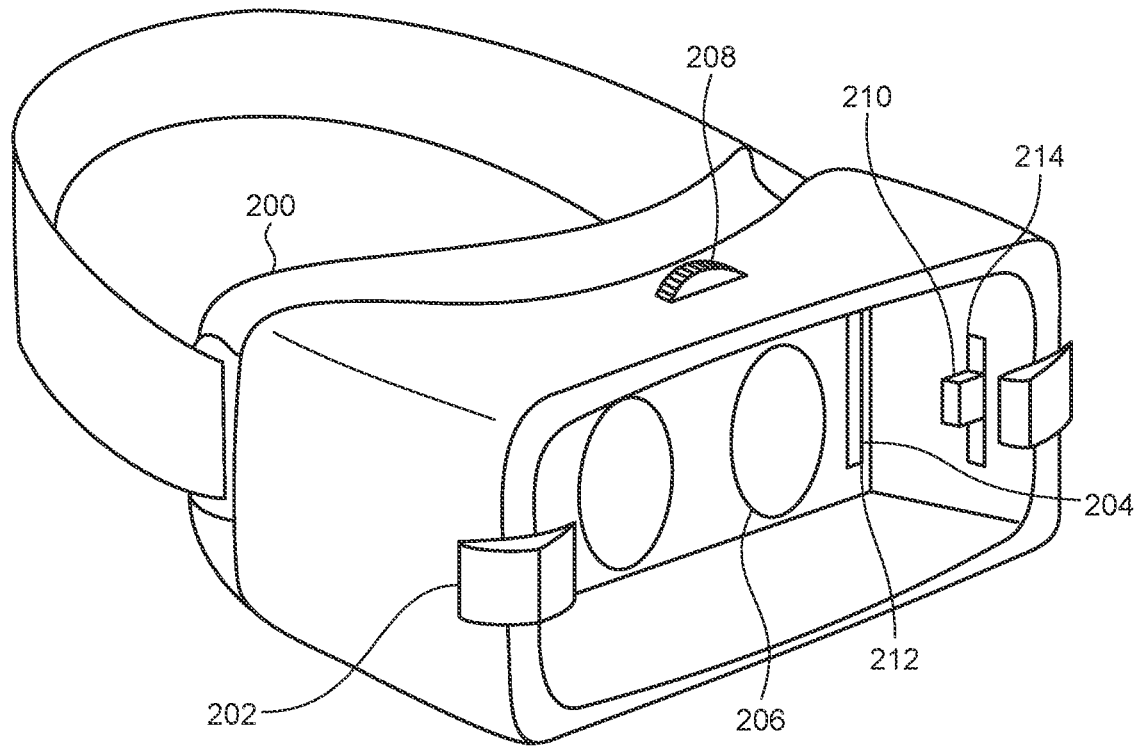
FIG. 2A is a diagram for explaining an example of a head mounted display housing according to an embodiment.
Figure 2B:
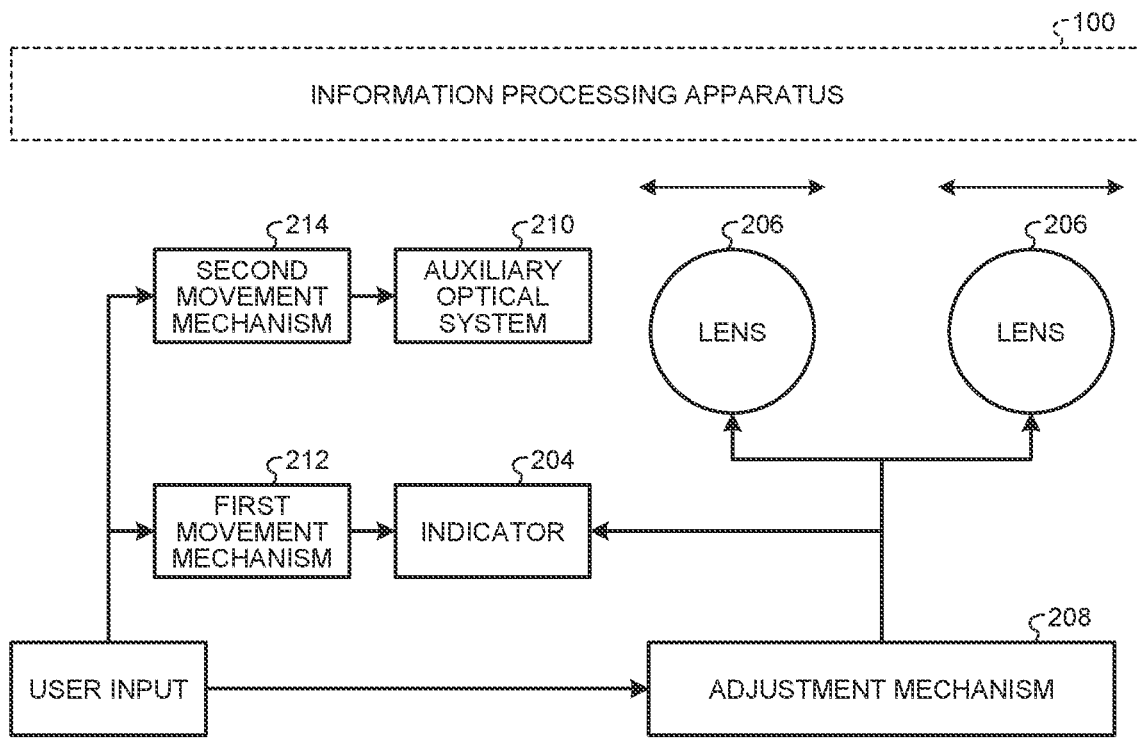
FIG. 2B is a diagram for explaining an example of the head mounted display housing according to an embodiment.

FIGS. 2A and 2B illustrate an example of a head mounted display housing 200 according to the present embodiment, and illustrate an external view and a conceptual view of an internal view, respectively. The head mounted display housing (hereinafter, simply referred to as a housing) 200 in the present embodiment includes a holding unit 202, an indicator 204, a lens 206, an adjustment mechanism 208, an auxiliary optical system 210, a first movement mechanism 212, a second movement mechanism 214, and the like.

In the present embodiment, the holding unit 202 holds the information processing apparatus 100 of the user. Furthermore, in order to prevent light from leaking into the housing 200 from a gap generated between the housing 200 and the information processing apparatus 100 when the holding unit 202 holds the information processing apparatus 100, the holding unit 202 may further hold a cover (not illustrated) so as to cover the held information processing apparatus 100.

In the present embodiment, the indicator 204 indicates a positional relationship between both eyes of the user. More specifically, the indicator 204 may indicate a pupillary distance of the user. The indicator 204 is adjusted by the adjustment mechanism 208 described later. The indicator 204 is provided at a position at which the indicator is detectable by various sensors (the visible light camera 114, the infrared camera 116, the microphone 118, the touch sensor 120, and the like) of the information processing apparatus 100.

The positional relationship between both eyes of the user indicated by the indicator 204 changes, for example, when the user adjusts the indicator 204. For example, the indicator 204 changes at least one of a color, a shape, a pattern, a position, a rotation angle, a length, or a size that is at least part of the appearance based on adjustment by the user. At least part of the appearance of the indicator 204 can be detected by various sensors of the information processing apparatus 100.

Note that the indicator 204 is not limited to the configuration indicating the positional relationship between both eyes of the user in appearance as described above. For example, the indicator 204 may be configured to come into contact with the touch sensor 120 of the information processing apparatus 100 attached to the housing 200. In this case, the position on the touch sensor 120 which the indicator 204 contacts may change based on the adjustment of the indicator 204 by the user.

Furthermore, the indicator 204 may be a member that generates a sound according to the positional relationship between both eyes of the user. In this case, the indicator 204 may change at least one of the frequency, the volume, and the type of sound to be generated based on adjustment by the user.

In the present embodiment, the lens 206 is a lens that enables stereoscopic viewing of an image displayed on the display 112 of the information processing apparatus 100 when the information processing apparatus 100 is held, and includes two lenses of a right-eye lens 206R and a left-eye lens 206L. When the user wears the housing 200 on the head, the right-eye lens 206R and the left-eye lens 206L are disposed in the housing 200 such that the right-eye lens 206R is disposed in front of the user's right eye and the left-eye lens 206L is disposed in front of the user's left eye.

In the present embodiment, the adjustment mechanism 208 adjusts the distance between the right-eye lens 206R and the left-eye lens 206L and adjusts the indicator 204. As described above, the indicator 204 may indicate information indicating the positional relationship between both eyes of the user. Specifically, the information indicating the positional relationship between the both eyes of the user may be information indicating the distance between the optical centers of the left and right lenses 206 adjusted by the user.

That is, the indicator 204 may change in length to indicate the distance between the left and right lenses 206 when adjusted by the adjustment mechanism 208. In addition, the indicator 204 may change the rotation angle so as to indicate the distance between the left and right lenses 206. In addition, the indicator 204 may emit sound at a frequency indicating the distance between the left and right lenses 206. In addition, the indicator 204 may change the contact position on the touch sensor 120 so as to indicate the distance between the left and right lenses 206.

In the present embodiment, the auxiliary optical system 210 is an auxiliary optical system provided for the purpose of focused imaging in a case where focused imaging cannot be performed because the distance between the camera and the indicator 204 is shorter than the shortest imaging distance of the camera when the indicator 204 is imaged by the visible light camera 114 or the infrared camera 116 of the information processing apparatus 100. Here, the auxiliary optical system 210 may be a lens, a prism, or a mirror. When the auxiliary optical system 210 is a lens, the camera and the lens of the auxiliary optical system 210 described above may be integrated, and the shortest imaging distance may be shortened to enable focused imaging. Furthermore, in a case where the auxiliary optical system 210 is a prism or a mirror, it is possible to perform focused imaging by extending the optical path length from the camera to the indicator 204.

In the present embodiment, the first movement mechanism 212 moves the position of the indicator 204. The first movement mechanism 212 may move the indicator 204 by a user's operation to a position where an image can be captured from a camera included in the information processing apparatus 100 held in the housing 200. That is, even when different types of information processing apparatuses 100 in which the cameras are disposed at different places are each mounted on the housing 200, the indicator 204 can be moved in accordance with the position of the camera, so that various types of information processing apparatuses 100 may be each mountable on the housing 200.

In the present embodiment, the second movement mechanism 214 moves the position of the auxiliary optical system 210. The second movement mechanism 214 may move the auxiliary optical system 210 by the user's operation such that the indicator 204 can be imaged from the camera included in the information processing apparatus 100 held in the housing 200. That is, even when different types of information processing apparatuses 100 in which the cameras are disposed at different places are each mounted on the housing 200, the auxiliary optical system 210 can be moved in accordance with the positions of the cameras and the indicators 204, so that various types of information processing apparatuses 100 may be each mounted on the housing 200 and used.

[1.2. Functional Configuration]

Next, a functional configuration example of the information processing apparatus according to the present embodiment will be described.

Figure 3:
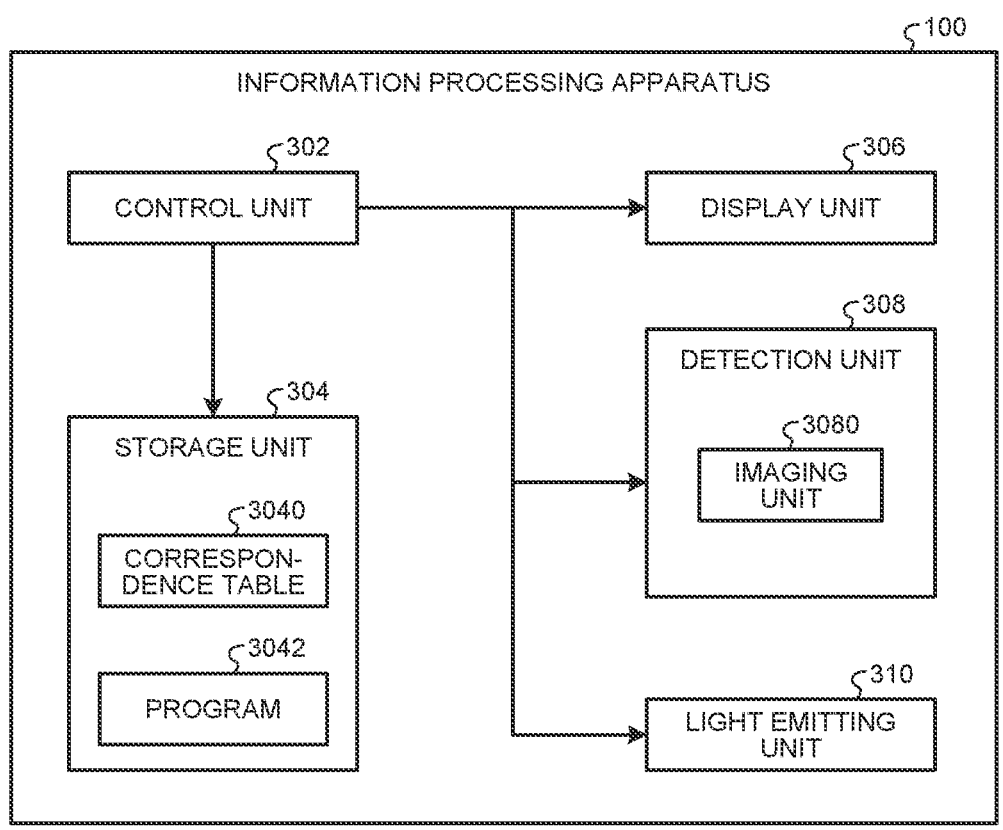
FIG. 3 is a diagram for explaining an example of a configuration of the information processing apparatus according to an embodiment.

FIG. 3 illustrates an example of a functional configuration of the information processing apparatus 100 according to the present embodiment. The functions of the information processing apparatus 100 in the present embodiment include a control unit 302, a storage unit 304, a display unit 306, a detection unit 308, a light emitting unit 310, and the like.

In the present embodiment, the control unit 302 is realized by the CPU 102 executing the program 3042 stored in the storage unit 304. The program 3042 stored in the storage unit 304 is copied to the main storage device such as the RAM 106 as a work area, and then executed by the CPU 102.

The control unit 302 also controls an image displayed on the display unit 306. For example, it issues a command for displaying an image recorded in the VRAM 108 on the display unit 306 to the GPU 104 to display the image on the display unit 306.

The control unit 302 also commands the detection unit 308 to perform detection. For example, the control unit 302 instructs the detection unit 308 to detect the indicator 204 at given timing during the execution of the program 3042 to store the detection result in the main storage device.

The control unit 302 also controls the reading of the information data indicated by the indicator 204 detected by the detection unit 308 and the analysis of the reading result, and controls the image displayed on the display unit 306 based on the analysis. For example, the control unit 302 detects the indicator 204 by the detection unit 308, analyzes the detection result to extract information indicated by the indicator 204, and adjusts the image to be displayed on the display unit 306 based on the extracted information.

The control unit 302 also determines whether a predetermined condition is satisfied, and in a case where the predetermined condition is satisfied, commands the detection unit 308 to perform detection while controlling light emission of the light emitting unit 310. For example, in a case where the detection unit 308 includes an imaging unit 3080 and the imaging unit 3080 images the indicator 204, it is determined that the predetermined condition is satisfied, and the light emission of the light emitting unit 310 is controlled.

In the present embodiment, the storage unit 304 includes a storage 110 which is an auxiliary storage device such as a hard disc drive (HDD) or a flash memory. The storage unit stores the program 3042 that controls the information processing apparatus 100 and a correspondence table 3040 that associates the information indicated by the indicator 204 with the control of the image displayed on the display unit 306. Specifically, it stores the correspondence table 3040 that associates the pupillary distance indicated by indicator 204 with the distance between the left-eye image and the right-eye image displayed on the display unit 306.

When there is a program execution start instruction from the user as described above, the program 3042 stored in the storage unit is copied to a work area such as the RAM 106 and then executed by the CPU 102 or the like. The correspondence table 3040 stored in the storage unit is used to control the image to be displayed on the display unit 306 together with the state of the indicator 204 detected by the detection unit 308.

The display unit 306 in the present embodiment visibly presents an image or the like generated by the control unit 302 to the user, and is realized by the display 112 of the information processing apparatus 100.

The display unit 306 may display the moving image information and the like stored in the storage unit under the control of the control unit 302. That is, the control unit 302 may read the moving image files stored in the storage unit as a file stream, sequentially transfer the files to the VRAM 108, issue a command for displaying a moving image of part of the original moving image file in the time axis direction on the display unit 306, where the moving image is a moving image transferred onto the VRAM 108, and display the part of the moving image on the display unit 306.

Furthermore, the display unit 306 may receive moving image information generated by an external server (not illustrated) different from any of the information terminal device and the housing 200 using a communication unit (not illustrated) provided in the information terminal device, and display the moving image information under the control of the control unit 302.

The detection unit 308 according to the present embodiment detects the indicator 204 of the housing 200. The detection unit 308 may be a perceptual sensor for such as a sound, a tactile sense, or a visual sense. An example of the sound sensor includes the microphone 118, an example of the tactile sensor includes the touch sensor 120, and examples of the visual sensor include the visible light camera 114 and the infrared camera 116.

The imaging unit 3080 in the present embodiment is a camera such as the visible light camera 114 or the infrared camera 116 provided in the detection unit 308 described above. The imaging unit 3080 includes at least a lens, an image sensor (CMOS, CCD, etc.), and a filter (color filter, infrared filter, etc.). The imaging unit 3080 may be disposed on both the front face and the back face of the information processing apparatus 100, or the visible light camera 114 and the infrared camera may be provided.

The light emitting unit 310 in the present embodiment is realized by the visible light projection device 122 and the infrared light projection device 124 of the information processing apparatus 100 as described above. When an object is imaged by the imaging unit 3080, even in a case where the amount of light is insufficient in a dark place, imaging may be enabled by causing the light projection device, which is the light emitting unit 310, to emit light to obtain the sufficient amount of light.

Furthermore, the light emitting unit 310 may be the display unit 306 instead of the flash or the like described above. That is, in a case where the display unit 306 includes the display 112 that emits light such as a liquid crystal display or an organic electro-luminescence (EL) display, the amount of light of the display 112 can be controlled by controlling the content of the image displayed on the display unit 306, or the like. Therefore, when an object is imaged by the imaging unit 3080, even in a case where the amount of light is insufficient in a dark place, imaging can be performed by obtaining the amount of light from the display 112.

[1.3. Overview of Usage]

In the present embodiment, an outline of a method for using the information processing apparatus 100 as a head mounted display in combination with the housing 200 will be described below.

Figure 5A:
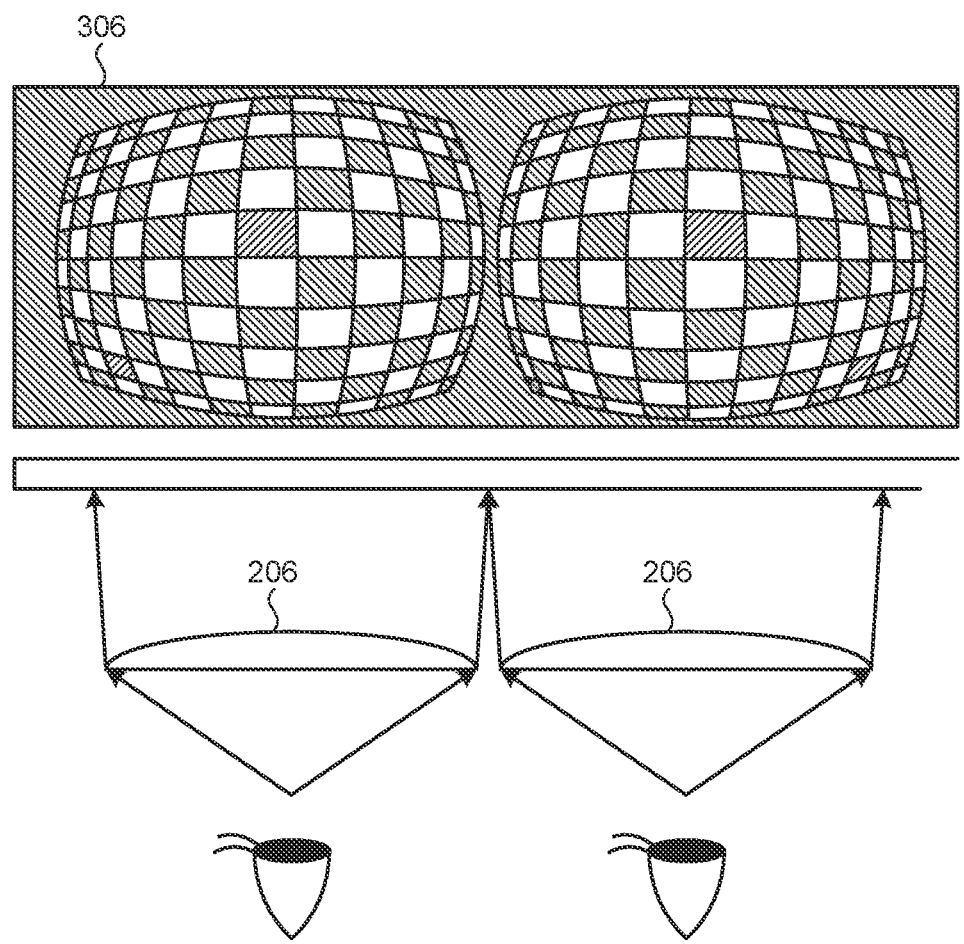
FIG. 5A is a diagram for explaining an example of adjustment of the information processing apparatus and the head mounted display housing according to an embodiment.
Figure 5B:
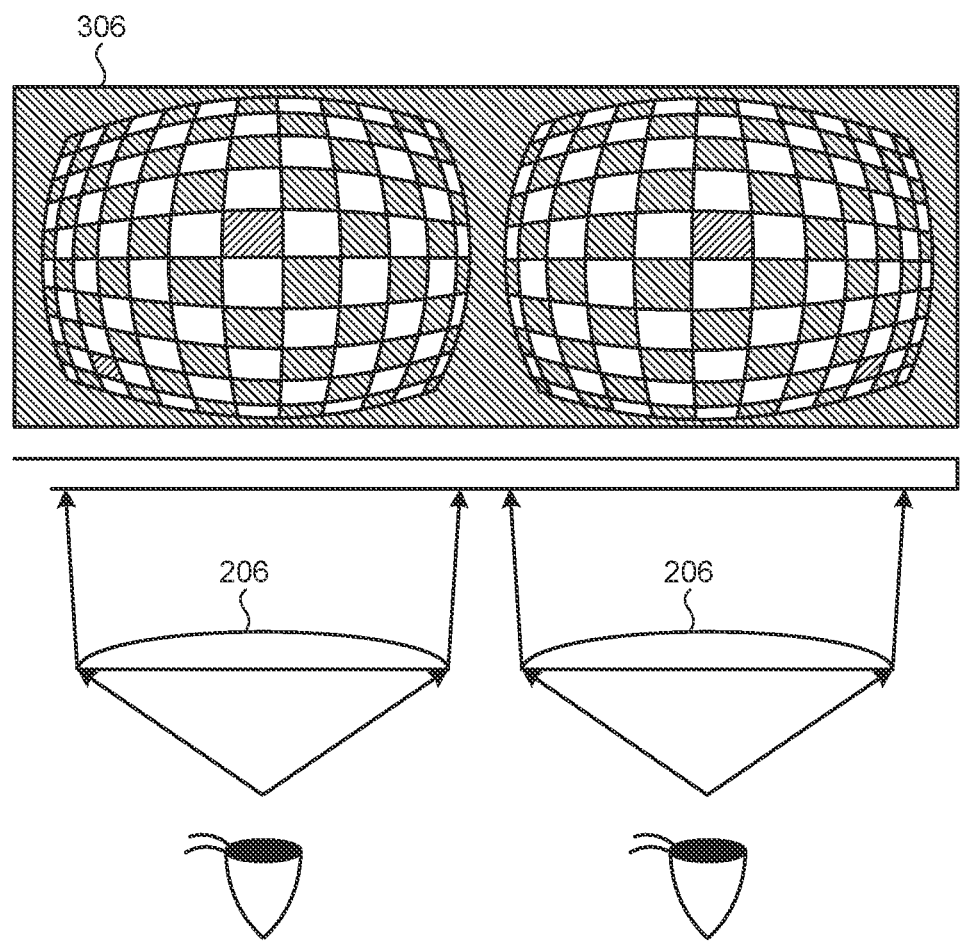
FIG. 5B is a diagram for explaining an example of adjustment of the information processing apparatus and the head mounted display housing according to an embodiment.
Figure 5C:
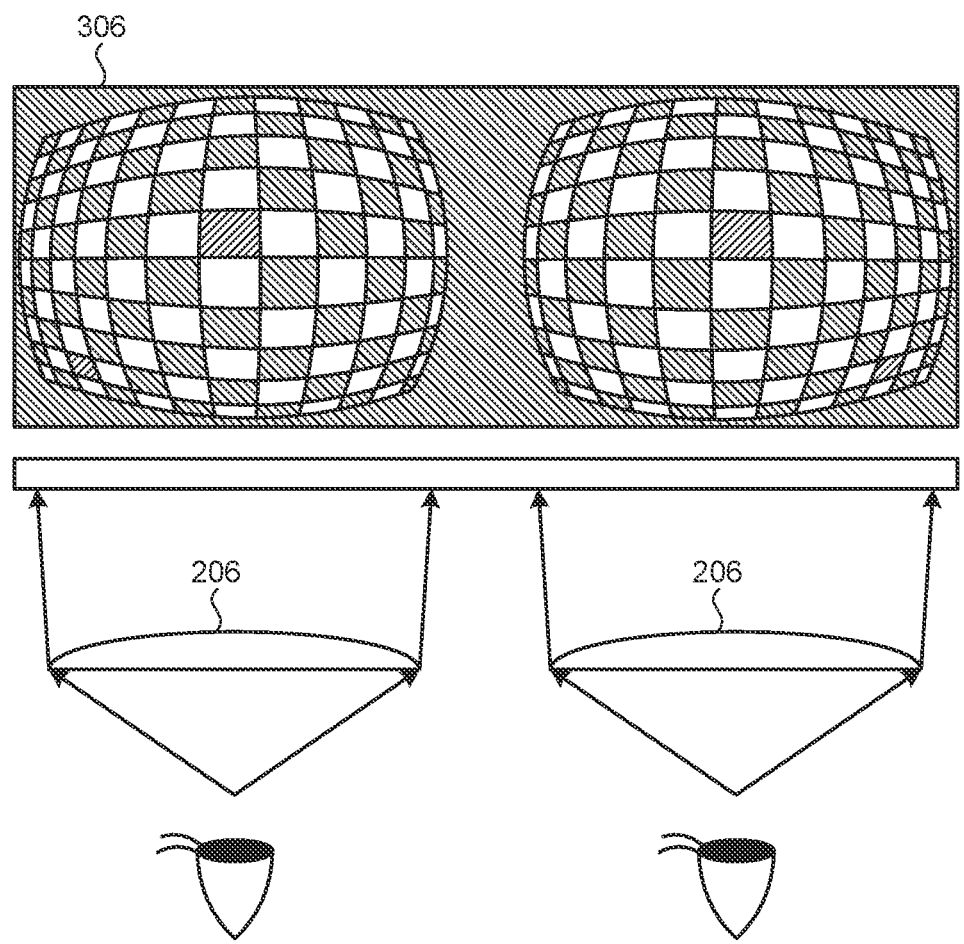
FIG. 5C is a diagram for explaining an example of adjustment of the information processing apparatus and the head mounted display housing according to an embodiment.

The user first activates the program 3042 of the information processing apparatus 100 possessed by the user. The program 3042 is a program 3042 for using the information processing apparatus 100 as a head mounted display. After the program 3042 is activated, a right-eye image and a left-eye image, which are images for binocular stereoscopic vision, are displayed as illustrated in FIGS. 5A, 5B, and 5C. The images are combined with the housing 200 as described later, so that the user can experience a stereoscopic video without failure.

Next, the user fits the information processing apparatus 100 with the program 3042 running into the housing 200 so as to be held by the holding unit 202 of the housing 200. At this time, the display unit 306106 of the information processing apparatus 100 is fitted so as to face the inside of the housing 200. After the information processing apparatus 100 is fitted into the housing 200, the user wears the housing 200 in which the information processing apparatus 100 is fitted on the user's head using the head band included in the housing 200.

In the housing 200, two lenses 206 are disposed at positions facing the display unit 306 of the information processing apparatus 100 in a state where the information processing apparatus 100 is held by the holding unit 202. The two lenses 206 each are a right-eye lens 206R and a left-eye lens 206L.

When the user wears the housing 200 on the head, the right-eye image of the display unit 306106 of the information processing apparatus 100 can be viewed by the user's right eye through the right-eye lens 206R disposed in the housing 200. The same applies to the left-eye image.

In a case where the pupillary distance of the user and the positions of the right-eye lens 206R and the left-eye lens 206L described above do not match, a suitable virtual reality experience cannot be obtained. In such a case, in order to obtain a suitable virtual reality experience, the user operates the adjustment mechanism partially exposed to the outside of the housing 200, adjusts the distance between the right-eye lens 206R and the left-eye lens 206L of the housing 200, and adapts the distance between the optical centers of the lenses 206 to the pupillary distance of the user.

The adjustment mechanism further adjusts at least one of a color, a shape, a pattern, a position, a rotation angle, a length, or a size of the indicator 204 disposed inside.

In the information processing apparatus 100 held in the housing 200, the indicator 204 adjusted by the adjustment mechanism 208 is detected by the detection unit 308. For example, this is performed by a camera provided in the imaging unit 3080 that is part of the detection unit 308 capturing an image of the indicator 204.

Figure 4A:
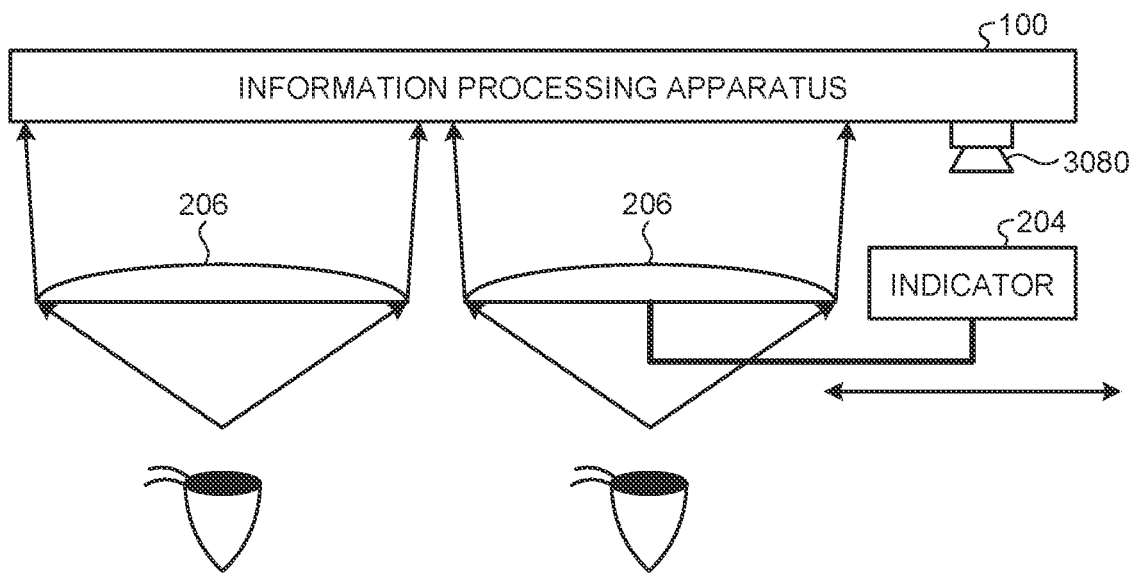
FIG. 4A is a diagram for explaining an example of an indicator of the head mounted display housing according to an embodiment.
Figure 4B:
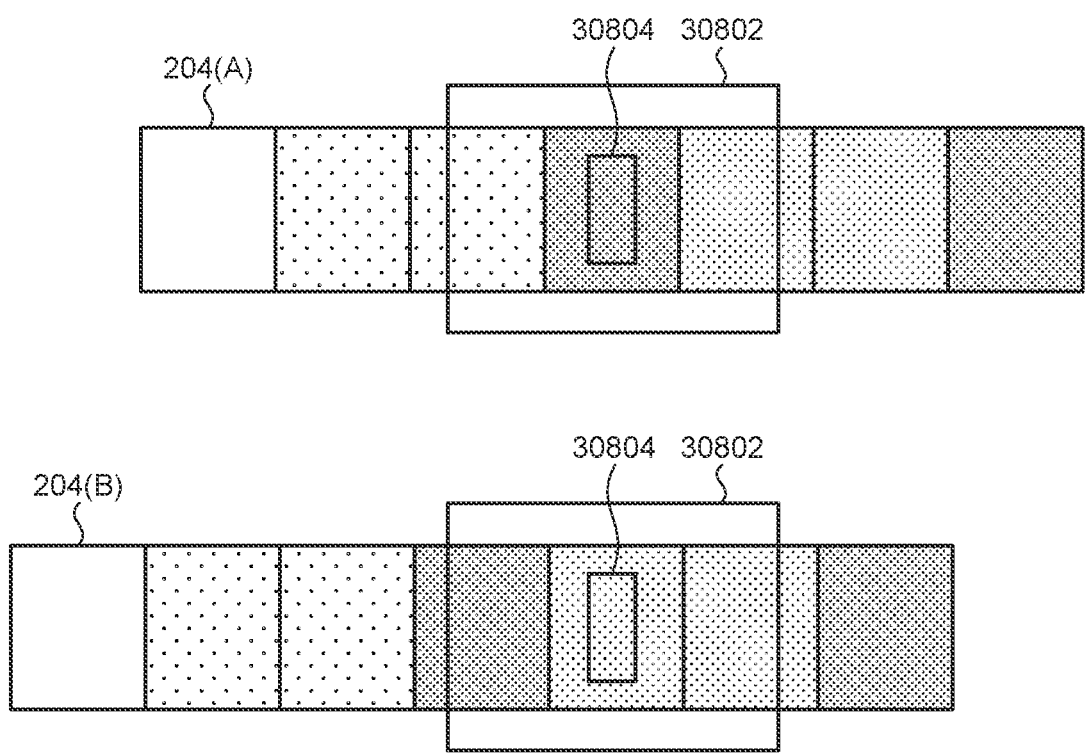
FIG. 4B is a diagram for explaining an example of the indicator of the head mounted display housing according to an embodiment.

FIGS. 4A and 4B illustrate a state in which the user adjusts the adjustment mechanism to move the indicator 204 and change the detection point on the indicator 204 detected by the camera of the imaging unit 3080. Specifically, as illustrated in FIG. 4A, when the user adjusts the adjustment mechanism and the distance between the lenses 206 decreases, the indicator 204 moves to the left. FIG. 4B illustrates how the position, on the indicator 204, detected by the imaging unit 3080 changes before and after the movement. A captured image region 30802 by the camera of the imaging unit 3080 and a detection region 30804 in the captured image region are fixed to the housing 200. Therefore, as the indicator 204 moves to the left, the detection region 30804 detects the fourth pattern portion from the right on the indicator 204 (A) before the movement, and then detects the third pattern portion from the right on the indicator 204 (B) after the movement. As the indicator 204 moves in conjunction with the movement of the lens 206 in this manner, the detection point on the indicator 204 detected by the camera of the imaging unit 3080 changes.

Although the case where the region of the indicator 204 is divided by different patterns is described above, the mode of the indicator 204 is not limited thereto. For example, the region of the indicator 204 may be divided by color instead of pattern. Furthermore, the color of the indicator 204 is not divided by a finite number of colors, but may be expressed by gradation of colors. In addition, the indicator 204 may not color-divided by color, but may be changed to white, black, and stepwise changing gray between white and black, or may be represented by gradation from white to black.

Figure 4C:
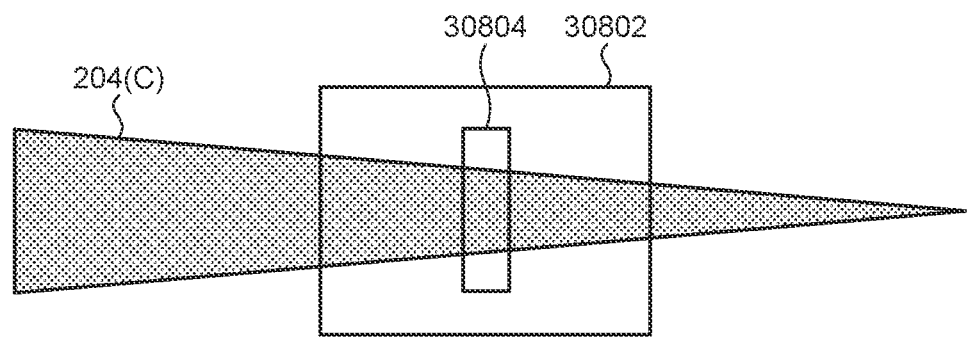
FIG. 4C is a diagram for explaining an example of the indicator of the head mounted display housing according to an embodiment.
Figure 4C:
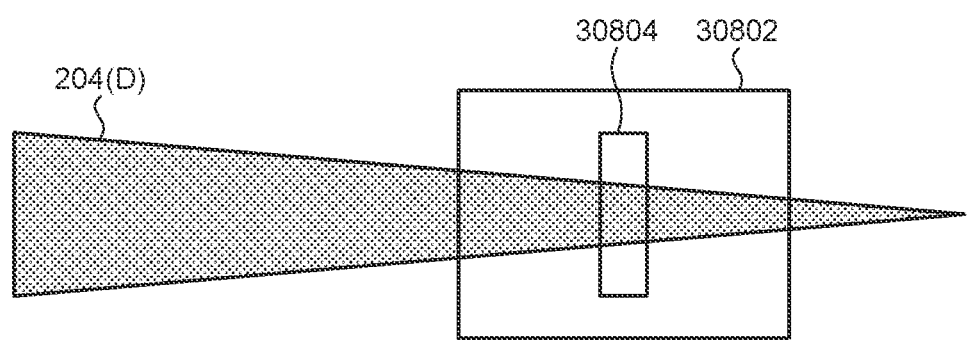

In addition, the indicator 204 may be detected based on the change in shape instead of the change in color or the change in shade of black and white depending on the location. For example, as illustrated in FIG. 4C, one side of the indicator 204 may be a large portion and the other side may be a small portion. In this case, the indicator 204 moves in conjunction with the lens 206 due to the adjustment by the adjustment mechanism, so that the detection location of the indicator 204 captured by the camera changes. Specifically, as in the case of FIG. 4B, when the position of the indicator 204 changes from the state of the upper part to the state of the lower part of FIG. 4C, the width of the indicator 204 detected changes from a wide detection result to a narrow detection result depending on the detection location.

Note that the shape of the indicator 204 may not continuously change from a large width to a small width, but may discontinuously change in a stepwise manner.

Further, a combination of a shape and a color may be used. In this case, since the detection results can be complemented with each other, improvement in detection accuracy is expected.

Next, the information of the indicator 204 detected by the detection unit 308 is collated with the correspondence table 3040 stored in the storage unit, and the information of the positional relationship between both eyes of the user indicated by the detection result is acquired and stored in the storage device. Specifically, the indicator 204 is imaged by the camera included in the imaging unit 3080 that is part of the detection unit 308, the captured image is analyzed by the processing unit, the information obtained as a result of the analysis is collated with the correspondence table 3040 described in the storage unit, the information of the pupillary distance of the user is acquired as a result of the collation, and the information of the pupillary distance of the user is stored in the storage device.

Note that, in a case where a sufficient amount of light cannot be obtained due to the darkness of the inside of the housing 200 at the time of the imaging described above, and it is difficult to image the indicator 204, the information processing apparatus 100 may set the initial value of the pupillary distance assuming that the information of the pupillary distance of the user cannot be obtained, or may cause the light emitting unit 310 to emit light, illuminate the indicator 204, perform imaging again, and detect the pupillary distance of the user indicated by the indicator 204.

Here, when the imaging unit 3080 is the visible light camera 114, the light emission of the light emitting unit 310 is preferably performed by the visible light projection device 122. The control unit 302 controls light emission of the visible light projection device 122, which is the light emitting unit 310, to illuminate the indicator 204, and performs control to image the indicator 204 illuminated with the light emission by the visible light camera 114, which is the imaging unit 3080.

Furthermore, the light emission of the light emitting unit 310 may be performed by adjusting the display of the display unit 306 in a case where the imaging unit 3080 is the visible light camera 114 and the visible light projection device 122 is not present, o there is a problem that the light emission of the visible light projection device 122 is dazzled for the user. That is, the amount of light may be adjusted by enhancing the luminance of the display 112 of the display unit 306 or controlling the display content to illuminate the indicator 204.

Furthermore, in a case where the imaging unit 3080 is the infrared camera 116, the light emission of the light emitting unit 310 may be the infrared light projection device 124 such as an infrared light or an infrared dot projector. In this case, since the user cannot see infrared rays, it is possible to secure the amount of light for illuminating the indicator 204 without causing a problem that light emission is felt dazzled by the infrared light projection device 124.

As described above, the detection with the combination of the indicator 204 changing in appearance by the adjustment mechanism 208 and the camera is described, but the combination of the indicator 204 and the detection unit 308 is not limited thereto. That is, even in a case where the indicator 204 is a member that causes the touch sensor 120 to react and the detection unit 308 is the touch sensor 120, the pupillary distance of the user adjusted by the adjustment mechanism 208 can be detected as in the case of the camera. Specifically, the pupillary distance of the user adjusted by the adjustment mechanism 208 is reflected in the indicator 204, the touch coordinates, of the touch sensor 120, at which the indicator 204 is touched are read by the detection unit 308, the read coordinates are collated with the correspondence table 3040 stored in the storage unit, information about the pupillary distance of the user is acquired as a result of the collation, and the information about the pupillary distance of the user is stored in the storage device.

In addition, even in a case where the indicator 204 is a member that emits a predetermined sound and the detection unit 308 is the microphone 118, the pupillary distance of the user adjusted by the adjustment mechanism 208 can be detected as in the case of the camera. Specifically, the pupillary distance of the user adjusted by the adjustment mechanism 208 is reflected in the indicator 204, a sound emitted by the indicator 204 and reflecting the adjustment of the adjustment mechanism 208 is detected by the microphone 118 serving as the detection unit 308, the detected sound is collated with the correspondence table 3040 stored in the storage unit, information about the pupillary distance of the user is acquired as a result of the collation, and the information about the pupillary distance of the user is stored in the storage unit. Here, the frequency of the sound emitted by the indicator 204 may be changed by the adjustment of the adjustment mechanism 208.

Next, the control unit 302 uses the information about the pupillary distance of the user stored in the storage device to adjust the distance between the right-eye image and the left-eye image displayed on the display unit 306. That is, as illustrated in FIGS. 5A, 5B, and 5C, by adjusting the adjustment mechanism 208 according to pupillary distances of various user, the distance is adjusted to an inter-lens distance and a distance between the left-eye image and the right-eye image of the display unit 306 appropriate to the pupillary distance of the user. Specifically, since the user A in FIG. 5A has a short pupillary distance, it is necessary to set the distance between the lenses 206 and the distance between the images of the display unit 306 to be short in order to provide a virtual reality experience suitable for the pupillary distance of the user A. The user A sets the distance between the lenses 206 and the distance between the images of the display unit 306 to a distance a1 and a distance a2, respectively, using the adjustment mechanism 208 so that the head mounted display conforms to the pupillary distance of the user A. Since the pupillary distance of the user B in FIG. 5B is an average of persons and is wider than that of the user A, the user B sets the distance between the lenses 206 and the distance between the images of the display unit 306 to a distance b1 (>distance a1) and a distance b2 (>distance a2) wider than those of the user A using the adjustment mechanism 208 in order to obtain a suitable virtual reality experience. Since the pupillary distance of the user C in FIG. 5C is wider than that of the user B, the user C sets the distance between the lenses 206 and the distance between the images of the display unit 306 to a distance c1 (>distance b1) and a distance c2 (>distance b2) which are wider than those of the user B using the adjustment mechanism 208 in order to obtain a suitable virtual reality experience.

In this manner, the user can simultaneously adjust the distance between the lenses 206 and the distance between the left and right eye images displayed on the display unit 306 using one adjustment mechanism 208 while the information processing apparatus 100 is held in the housing 200 so as to be suitable for the pupillary distance of the user. Therefore, it is possible to save the trouble of once detaching the information processing apparatus 100 held in the housing 200 for adjusting the pupillary distance, setting the pupillary distance in the information processing apparatus 100, and then attaching the information processing apparatus 100 to the housing 200 again.

Furthermore, the control unit 302 may display the information about the pupillary distance of the user stored in the storage device on the display unit 306. In this way, in a case where a user knows the pupillary distance of the user, the user can adjust the distance to match the pupillary distance of the user by using the adjustment mechanism 208 while viewing the value displayed on the display unit 306 of the information processing apparatus 100.

In a case where the housing 200 holds and removes the first information processing apparatus 100 and then holds the second information processing apparatus 100 different from the first information processing apparatus 100, the positions of the cameras and the light projection devices on the information processing apparatus between the first information processing apparatus 100 and the second information processing apparatus 100 may be different from each other.

In this case, due to a difference in the position of the camera and the light projection device on the information processing apparatus 100 between the first information processing apparatus 100 and the second information processing apparatus 100, the first information processing apparatus 100 can detect the indicator 204 of the housing 200, but it may possible that the second information processing apparatus 100 cannot detect or has difficulties in detecting the indicator 204 of the housing 200.

In order to absorb such a difference in the physical configuration of the information processing apparatus 100, the housing 200 may include the first movement mechanism 212 and the second movement mechanism 214 as described above.

Furthermore, even in a case where the housing 200 does not include the first movement mechanism 212 and the second movement mechanism 214, the detection region used for detection of the indicator 204 in the captured image of the information processing apparatus 100 may be changed based on the position of the camera of the information processing apparatus 100.

[1.4. Description of Operation (Flowchart)]

Next, an example of a processing procedure of the information processing apparatus 100 according to the present embodiment will be described. FIGS. 6 to 9 are flowcharts illustrating an example of a processing procedure executed by the information processing apparatus 100 according to the embodiment. Note that the processing procedures illustrated in FIGS. 6 to 9 are implemented by the information processing apparatus 100 executing the program 3042.

As illustrated in FIG. 6, the control unit 302 of the information processing apparatus 100 determines whether the indicator 204 has been detected (step S10). For example, the image captured by the imaging unit 3080 included in the information processing apparatus 100 is analyzed, and in a case where the indicator 204 can be detected, the process proceeds to step S11 as the affirmative determination (Yes in step S10), and in a case where the indicator 204 cannot be detected, the process proceeds to step S13 as the negative determination (No in step S10).

The control unit 302 determines information indicating the pupillary distance (step S11). For example, it determines the pupillary distance indicated by the indicator 204 from a color, a pattern, a shape, and the like of the indicator 204 detected in the image captured by the imaging unit 3080 of the information processing apparatus 100. Upon completion of the process in step S11, the control unit 302 advances the process to step S12.

The control unit 302 changes the video display (step S12). For example, the distance between the right-eye image and the left-eye image for stereoscopic vision displayed on the display unit 306306 of the information processing apparatus 100 is adjusted. At the time of adjustment, information indicating the pupillary distance determined in step S11 is used. Upon completion of the process in step S12, the control unit 302 advances the process to step S13.

The control unit 302 generates and displays an image (step S13). For example, it generates a right-eye image and a left-eye image for stereoscopic vision displayed on the display unit 306 of the information processing apparatus 100, the generated right-eye image and left-eye image are disposed based on the distance between the right-eye image and the left-eye image changed in step S12, and the disposed video is displayed on the display unit 306. When the indicator 204 cannot be detected in step S10, the distance between the right-eye image and the left-eye image based on the information indicating the pupillary distance cannot be adjusted in steps S11 and S12, and thus, the left-eye image and the right-eye image adjusted to a prescribed distance are displayed on the display unit 306. Upon completion of the process in step S13, the control unit 302 advances the process to step S14.

The control unit 302 determines whether the program 3042 has been terminated (step S14). For example, it is determined whether the user has ended the program 3042 being executed by the information processing apparatus 100, and in a case where the user has ended the program, the program 3042 is ended as the affirmative determination (Yes in step S14). In a case where the process has not been completed, the process returns to step S10 as the negative determination (No in step S14).

FIG. 7 illustrates a processing procedure of a process of displaying that the indicator 204 is not detected and ending the program 3042 when the indicator 204 is not detected. Since steps S21 to S24 in FIG. 7 are similar to steps S11 to S14 in FIG. 6, the description thereof will not be repeated here.

The control unit 302 determines whether the indicator 204 is detected (step S20). For example, the image captured by the imaging unit 3080 included in the information processing apparatus 100 is analyzed, and in a case where the indicator 204 can be detected, the process proceeds to step S21 as the affirmative determination (Yes in step S20), and in a case where the indicator 204 cannot be detected, the process proceeds to step S25 as the negative determination (No in step S20).

The control unit 302 displays that the indicator 204 is not detected (step S25). For example, it displays, on the display unit 306 of the information processing apparatus 100, a statement that the indicator 204 has not been detected. When the process in step S25 ends, the control unit 302 waits for the user's input and ends the program 3042.

FIG. 8 illustrates a processing procedure for turning on the illumination and making it easy to detect the indicator 204 when the indicator 204 is not detected. Since steps S31 to S34 in FIG. 8 are similar to steps S11 to S14 in FIG. 6, the description thereof will not be repeated here.

The control unit 302 determines whether the indicator 204 is detected (step S30). For example, the image captured by the imaging unit 3080 included in the information processing apparatus 100 is analyzed, and in a case where the indicator 204 can be detected, the process proceeds to step S31 as the affirmative determination (Yes in step S30), and in a case where the indicator 204 cannot be detected, the process proceeds to step S35 as the negative determination (No in step S30).

The control unit 302 turns on the illumination (step S35). For example, the light emitting unit 310 included in the information processing apparatus 100 is caused to emit light to illuminate the indicator 204. Upon completion of the process in step S35, the control unit 302 advances the process to step S36.

The control unit 302 turns on the illumination in step S35, and then determines whether the indicator 204 is detected (step S36). For example, the image captured by the imaging unit 3080 included in the information processing apparatus 100 is analyzed, and in a case where the indicator 204 can be detected, the process proceeds to step S31 as the affirmative determination (Yes in step S36), and in a case where the indicator 204 cannot be detected, the process proceeds to step S33 as the negative determination (No in step S36).

FIG. 9 illustrates a processing procedure of a process of turning on the illumination to make it easier to detect the indicator 204 when the indicator 204 is not detected, and displaying that the indicator 204 is not detected and ending the program 3042 when the indicator 204 is not detected again. Since steps S40 to S45 in FIG. 9 are similar to steps S30 to S45 in FIG. 8, the description thereof will not be repeated here.

The control unit 302 turns on the illumination in step S45, and then determines whether the indicator 204 is detected (step S46). For example, the image captured by the imaging unit 3080 included in the information processing apparatus 100 is analyzed, and in a case where the indicator 204 can be detected, the process proceeds to step S41 as the affirmative determination (Yes in step S46), and in a case where the indicator 204 cannot be detected, the process proceeds to step S47 as the negative determination (No in step S46).

The control unit 302 displays that the indicator 204 is not detected (step S47). For example, it displays, on the display unit 306 of the information processing apparatus 100, a statement that the indicator 204 has not been detected. When the process in step S47 ends, the control unit 302 waits for the user's input and ends the program 3042.

Although the information processing apparatus 100 is described above as the present embodiment, the present embodiment is not limited to such an embodiment. The present embodiment can be applied to various devices such as a tablet-type device, a game machine, and a computer such as a personal computer (PC).

[2. Other Embodiments]

Although the first embodiment is described above, the following other embodiments are also conceivable.

An embodiment is also conceivable in which a plurality of pieces of moving image content corresponding to various pupillary distances is stored in the storage unit of the information processing apparatus 100, and a moving image content suitable for the information indicated by the indicator 204 detected by the detection unit 308 is displayed on the display unit 306.

Furthermore, an embodiment is also conceivable in which the information processing apparatus 100 transmits information indicated by the indicator 204 detected by the detection unit 308 to a server, the server generates a moving image based on the received information indicated by the indicator 204, the server transmits the generated moving image to the information processing apparatus 100, and the information processing apparatus 100 displays the received moving image on the display unit 306.

The information indicated by the indicator 204 may not be the pupillary distance. For example, an embodiment is also conceivable in which the information is information for adjusting the brightness of the display on the display unit 306 or information about the cursor position for selecting a menu in a case where the display unit 306 is a menu selection screen.

The preferred embodiments of the present disclosure have been described in detail with reference to the accompanying drawings, but the technical scope of the present disclosure is not limited to such examples. It is obvious that those skilled in the art in the technical field of the present disclosure can find various revisions and modifications within the scope of a technical concept described in claims, and it should be understood that these revisions and modifications will also be naturally come under the technical scope of the present disclosure.

The above-described configuration shows an example of the present embodiment and, of course, belongs to the technical scope of the present disclosure.

Furthermore, the effects described in the present specification are merely illustrative or exemplified effects, and are not limitative. That is, the technique according to the present disclosure can accomplish other effects apparent to those skilled in the art from the description of the present specification, in addition to or instead of the effects described above.

Note that the following configuration also belong to the technical scope of the present disclosure.

(1)
An information processing apparatus that is detachably held by a housing to be usable as a head mounted display, the information processing apparatus comprising:
 a display unit that displays an image;
 a detection unit that detects an indicator provided in the housing; and
 a control unit that controls the image displayed on the display unit based on information indicated by the indicator detected by the detection unit.

(2)
The information processing apparatus according to (1), wherein the information indicated by the indicator is information about a positional relationship between both eyes of a user.

(3)
The information processing apparatus according to (1) or (2), wherein the image displayed on the display unit includes a left-eye image and a right-eye image.

(4)
The information processing apparatus according to (3), wherein the control unit adjusts a distance between the left-eye image and the right-eye image based on the information indicated by the indicator.

(5)
The information processing apparatus according to any one of (1) to (4), wherein the detection unit includes an imaging unit that images the indicator, and detects information indicated by the indicator based on an image acquired by the imaging unit.

(6)
The information processing apparatus according to (5), further comprising a light emitting unit that illuminates the indicator.

(7)
The information processing apparatus according to (6), wherein the light emitting unit is the display unit.

(8)
The information processing apparatus according to (6), wherein
 the imaging unit is an infrared camera, and
 the light emitting unit is an infrared light source.

(9)
The information processing apparatus according to any one of (6) to (8), wherein
 the light emitting unit emits light to illuminate the indicator when information indicated by the indicator is not detected from the image acquired by the imaging unit, and
 the imaging unit images the indicator again illuminated by the light emitting unit.

(10)
The information processing apparatus according to any one of (1) to (9), wherein the control unit causes the display unit to display information indicated by the indicator.

(11)
A head mounted display housing that is usable as a head mounted display by detachably holding an information processing apparatus including a detection unit and a display unit, the housing comprising:
 a holding unit that detachably holds the information processing apparatus;
 an indicator disposed at a position at which the indicator is detectable by the detection unit of the information processing apparatus in a state of being held by the holding unit; and
 an adjustment mechanism that causes a user to adjust the indicator.

(12)
The head mounted display housing according to (11), wherein the information indicated by the indicator is information about a positional relationship between both eyes of a user.

(13)
The head mounted display housing according to (11) or 12, wherein the adjustment mechanism is partially exposed outside the housing and is manually adjustable by a user.

(14)
The head mounted display housing according to any one of (11) to (13), further comprising:
 two lenses disposed at positions facing the display unit of the information processing apparatus in a state of being held by the holding unit, wherein
 the adjustment mechanism causes a user to adjust a distance between the two lenses, and
 the indicator indicates a distance between the two lenses as information indicated by the indicator.

(15)
The head mounted display housing according to any one of (11) to (14), wherein at least one of a color, a shape, a pattern, a position, a rotation angle, a length, or a size of the indicator changes according to adjustment by the adjustment mechanism.

(16)
The head mounted display housing according to any one of (11) to (15), further comprising a first movement mechanism for moving the indicator according to a position of the detection unit of the information processing apparatus in a state of being held by the holding unit.

(17)

The head mounted display housing according to any one of (11) to (16), further comprising: an auxiliary optical system disposed between the detection unit of the information processing apparatus in a state of being held by the holding unit and the indicator.

(18)

The head mounted display housing according to (17), further comprising a second movement mechanism for moving the auxiliary optical system according to a position of the detection unit of the information processing apparatus in a state of being held by the holding unit.

(19)

A head mounted display system comprising: an information processing apparatus including a detection unit and a display unit; and a housing that is usable as a head mounted display by detachably holding the information processing apparatus, wherein
the housing includes
a holding unit that detachably holds the information processing apparatus,
an indicator disposed at a position at which the indicator is detectable by the detection unit of the information processing apparatus in a state of being held by the holding unit, and
an adjustment mechanism that causes a user to adjust the indicator, and
the information processing apparatus includes
a detection unit that detects the indicator provided in the housing, and
a control unit that controls an image displayed on the display unit based on information indicated by the indicator detected by the detection unit.

(20)

An information processing method executed by an information processing apparatus that includes a display unit and is detachably held by a housing to be usable as a head mounted display, the method comprising:
detecting an indicator provided in the housing; and
controlling an image displayed on the display unit based on information indicated by the detected indicator.

REFERENCE SIGNS LIST

100 INFORMATION PROCESSING APPARATUS
102 CPU
104 GPU
106 RAM
108 VRAM
110 STORAGE
112 DISPLAY
114 VISIBLE LIGHT CAMERA
116 INFRARED CAMERA
118 MICROPHONE
120 TOUCH SENSOR
122 VISIBLE LIGHT PROJECTION DEVICE
124 INFRARED LIGHT PROJECTION DEVICE
126 BUS
200 HEAD MOUNTED DISPLAY HOUSING
202 HOLDING UNIT
204 INDICATOR
206 LENS
208 ADJUSTMENT MECHANISM
210 AUXILIARY OPTICAL SYSTEM
212 FIRST MOVEMENT MECHANISM
214 SECOND MOVEMENT MECHANISM
302 CONTROL UNIT
304 STORAGE UNIT
306 DISPLAY UNIT
308 DETECTION UNIT
310 LIGHT EMITTING UNIT

The invention claimed is:

1. An information processing apparatus that is detachably held by a housing to be usable as a head mounted display, the information processing apparatus, comprising:
a display unit that displays an image;
a detection unit that detects an indicator provided in the housing; and
a control unit that controls the image displayed on the display unit based on information indicated by the indicator detected by the detection unit.

2. The information processing apparatus according to claim 1, wherein the information indicated by the indicator is information about a positional relationship between both eyes of a user.

3. The information processing apparatus according to claim 1, wherein the image displayed on the display unit includes a left-eye image and a right-eye image.

4. The information processing apparatus according to claim 3, wherein the control unit adjusts a distance between the left-eye image and the right-eye image based on the information indicated by the indicator.

5. The information processing apparatus according to claim 1, wherein
the detection unit includes an imaging unit that images the indicator, and
the detection unit is further configured to detect the information indicated by the indicator based on an image acquired by the imaging unit.

6. The information processing apparatus according to claim 5, further comprising a light emitting unit that illuminates the indicator.

7. The information processing apparatus according to claim 6, wherein the light emitting unit is the display unit.

8. The information processing apparatus according to claim 6, wherein
the imaging unit is an infrared camera, and
the light emitting unit is an infrared light source.

9. The information processing apparatus according to claim 6, wherein
the light emitting unit emits light to illuminate the indicator when the information indicated by the indicator is not detected from the image acquired by the imaging unit, and
the imaging unit images the indicator again illuminated by the light emitting unit.

10. The information processing apparatus according to claim 1, wherein the control unit causes the display unit to display the information indicated by the indicator.

11. A head mounted display housing that is usable as a head mounted display by detachably holding an information processing apparatus including:
a detection unit; and
a display unit, wherein
the head mounted display housing comprises:
a holding unit that detachably holds the information processing apparatus;
an indicator disposed at a position at which the indicator is detectable by the detection unit of the information processing apparatus in a state of being held by the holding unit; and
an adjustment mechanism that causes a user to adjust the indicator.

12. The head mounted display housing according to claim 11, wherein information indicated by the indicator is information about a positional relationship between both eyes of the user.

13. The head mounted display housing according to claim 11, wherein the adjustment mechanism is partially exposed outside the housing and is manually adjustable by a user.

14. The head mounted display housing according to claim 11, further comprising:
   two lenses disposed at positions facing the display unit of the information processing apparatus in the state of being held by the holding unit, wherein
   the adjustment mechanism causes a user to adjust a distance between the two lenses, and
   the indicator indicates the distance between the two lenses as information indicated by the indicator.

15. The head mounted display housing according to claim 11, wherein at least one of a color, a shape, a pattern, the position, a rotation angle, a length, or a size of the indicator changes according to adjustment by the adjustment mechanism.

16. The head mounted display housing according to claim 11, further comprising a first movement mechanism for moving the indicator according to a position of the detection unit of the information processing apparatus in a state of being held by the holding unit.

17. The head mounted display housing according to claim 11, further comprising: an auxiliary optical system disposed between the detection unit of the information processing apparatus in a state of being held by the holding unit and the indicator.

18. The head mounted display housing according to claim 17, further comprising a second movement mechanism for moving the auxiliary optical system according to a position of the detection unit of the information processing apparatus in a state of being held by the holding unit.

19. A head mounted display system comprising:
   an information processing apparatus that includes:
      a display unit; and
      a housing that is usable as a head mounted display by detachably holding the information processing apparatus, wherein
      the housing includes:
         a holding unit that detachably holds the information processing apparatus,
         an indicator disposed at a position at which the indicator is detectable by the detection unit of the information processing apparatus in a state of being held by the holding unit, and
         an adjustment mechanism that causes a user to adjust the indicator;
   a detection unit that detects the indicator provided in the housing, and
   a control unit that controls an image displayed on the display unit based on information indicated by the indicator detected by the detection unit.

20. An information processing method executed by an information processing apparatus that includes a display unit and is detachably held by a housing to be usable as a head mounted display, the method comprising:
   detecting an indicator provided in the housing; and
   controlling an image displayed on the display unit based on information indicated by the detected indicator.

* * * * *